S. S. HICKOK.
Potato-Digger.
No. 37,691.
Patented Feb. 17, 1863.
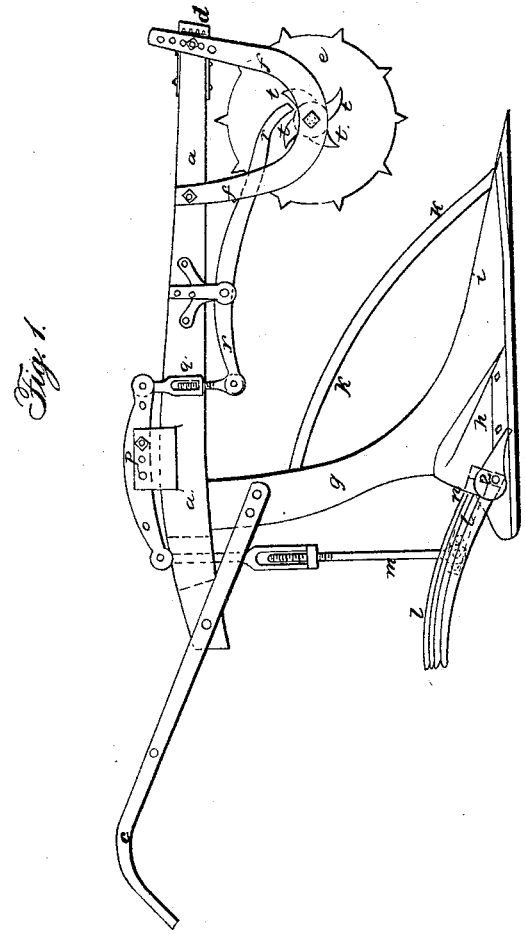
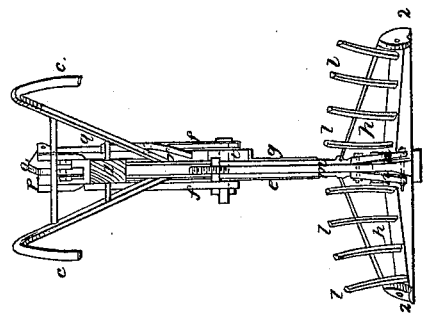
Witnesses:
Lemuel W Sewell
Chas. H. Smith
Inventor:
S. S. Hickok.

UNITED STATES PATENT OFFICE.

SAMUEL SHERMAN HICKOK, OF MARLBOROUGH, NEW JERSEY.

IMPROVEMENT IN POTATO-DIGGERS.

Specification forming part of Letters Patent No. 37,691, dated February 17, 1863.

*To all whom it may concern:*

Be it known that I, SAMUEL S. HICKOK, of Marlborough, in the county of Monmouth and State of New Jersey, have invented, made, and applied to use a certain new and useful Improvement in Diggers for Potatoes, &c.; and I do hereby declare the following to be a full, clear, and exact description of my said invention, reference being had to the annexed drawings, making part of this specification, wherein—

Figure 1 is a side view of my said digger, and Fig. 2 is an end view of the same.

Similar marks of reference indicate the same parts.

Plows have heretofore been made with double mold-boards and with stationary fingers behind the shares.

The nature of my said invention consists in a set of vibrating prongs, upon which the earth and potatoes are delivered from the share, and the vibration of which sifts the earth through the prongs and delivers the potatoes loosely upon the earth, such vibrating bars being combined with a projecting nose to the plow, to guide the same and simultaneously pass below the potatoes and loosen the earth gradually, so that the potatoes will not be injured, and I employ a curved projecting bar to hold up the vines and weeds and separate them, so that they do not become covered by or embedded in the earth, but fall loosely upon the top.

In the drawings, $a$ is the plow-beam, of any desired size, with the handles $c$ and clevis $d$.

$e$ is a wheel fitted upon arcs $f$, so that it may be adjusted to regulate the depth of the plow.

$g$ is the upright part of the share, and $h$ are the mold-boards, formed as inclined planes, standing diagonally to the center part, $g$. The front edges of these mold-boards should each have a movable plate to act as a cutter in plowing.

$i$ is a nose projecting from the plow and on line with the beam $a$. This nose is a gradual taper, and by its length guides the plow, and at the same time gradually loosens the earth, so as not to injure the potatoes.

$k$ is a clearing-bar extending from the upright $g$ to near the end of the nose $i$, and it should be slightly curved, as shown. The action of this bar, when in use, is that the weeds, vines, &c., are by it raised and held up, and they gradually pass to the rear and fall away on the earth, instead of being turned under and partially buried or accumulating in front of the upright. I find in practice that a bar curved downward and forward like the nose of a plow collects the weeds and vines against the most vertical portion, whereas a bar curved forward and downward first raises the loose vines, and then as they come upon the more horizontal portion they are so high up that they fall away and do not clog. The earth and potatoes, as they pass over the mold-boards $h$, are taken by the vibrating prongs $l$, and by the vibration the earth is sifted through the prongs and the potatoes fall away upon the earth, to be gathered up as usual. These prongs $l$ are each made wider at the top than at the bottom, so that the earth or stones cannot become wedged in between them, and the prongs are united to a head that is set on pivots beneath the back edges of the respective mold-boards at 2 2, ears being provided on the under sides of said mold-boards for the reception of said pivots; and $n$ $n$ are arms projecting from the heads of the prongs and receiving between them the lower end of the adjustable link $m$, the upper end of which link passes through the plow-beam and is united to one end of the lever $o$. The length of this link is to be adjusted by its screw before being attached in place, and the inclination of the prongs regulated thereby. The lever $v$ is on a fulcrum, $p$, that may be varied in position by changing the fulcrum-pin into a different hole. $q$ is a link attached to the end of this lever $o$ and connecting the same to the lever $r$ on the fulcrum $s$. This link $q$ should also be adjusted as shown. The forward end of the lever $r$ passes down near the side of the wheel $e$, and cams $t$ $t$, connected to said wheel, raise the end of the said lever $r$, and through the compound levers $o$ and $r$ and their respective links raise the prongs, and as each cam passes the end of the lever the prongs drop and shake or sift out the earth from the potatoes, the latter passing away over the prongs and lying on the surface.

The digger or plow may be used for any desired purpose. It will bring stones up to the surface, and when used as a horse-hoe for weeding it will shake the dirt out of the roots of the weeds, so that they will wither and die, instead of again taking root.

What I claim, and desire to secure by Letters Patent, is—

1. The vibrating prongs $l\ l$, fitted as specified, in combination with the mold-boards $h$ and nose $i$, for the purposes and as set forth.

2. The bar $k$, curved forward and downward, as shown, and extending in front of the mold-boards to insure the raising of the weeds and vines sufficiently to prevent their clogging, as set forth.

3. The arrangement of the compound levers $o$ and $r$ and links $m$ and $q$, in combination with the wheel $e$ and cams $t\ t$, for giving motion to the vibrating prongs, as set forth.

In witness whereof I have hereunto set my signature this 31st day of December, 1862.

S. S. HICKOK.

Witnesses:
LEMUEL W. SERRELL,
CHAS. H. SMITH.